United States Patent [19]
Averitt

[11] 3,802,077
[45] Apr. 9, 1974

[54] TOOL HOLDER
[76] Inventor: Marnie C. Averitt, 107 Westdale Ct., Timonium, Md. 21093
[22] Filed: Aug. 2, 1972
[21] Appl. No.: 277,157

[52] U.S. Cl................................... 30/339, 30/169
[51] Int. Cl............................................. B26b 5/00
[58] Field of Search ............ 30/330, 331, 332, 337, 30/339, 169, 171, 333; 279/44

[56] References Cited
UNITED STATES PATENTS
931,778 8/1909 Levinsohn........................ 30/330 X
2,610,401 9/1952 Vosbikian........................... 30/332
1,446,989 2/1923 Osburn............................. 30/169 X Primary Examiner—Othell M. Simpson
Assistant Examiner—J. C. Peters

[57] ABSTRACT

A tool holder including a handle assembly comprising a pair of confronting elongated members interlocked adjacent one end and adapted to releasably clamp a tool therebetween. The opposite ends of the elongated members are releasably secured by fastener means, which, when released, allows removal and/or replacement of the tool, for example, a knife blade.

5 Claims, 6 Drawing Figures

PATENTED APR 9 1974 3,802,077
FIG. 1 FIG. 2 FIG. 3
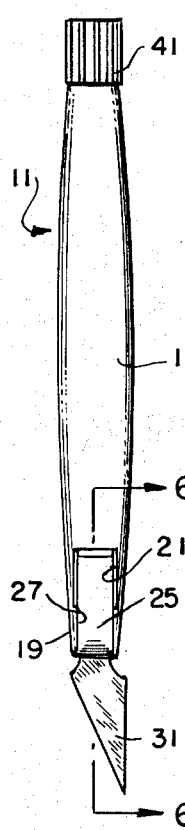
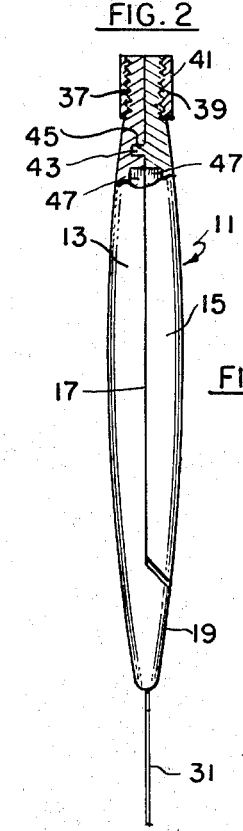
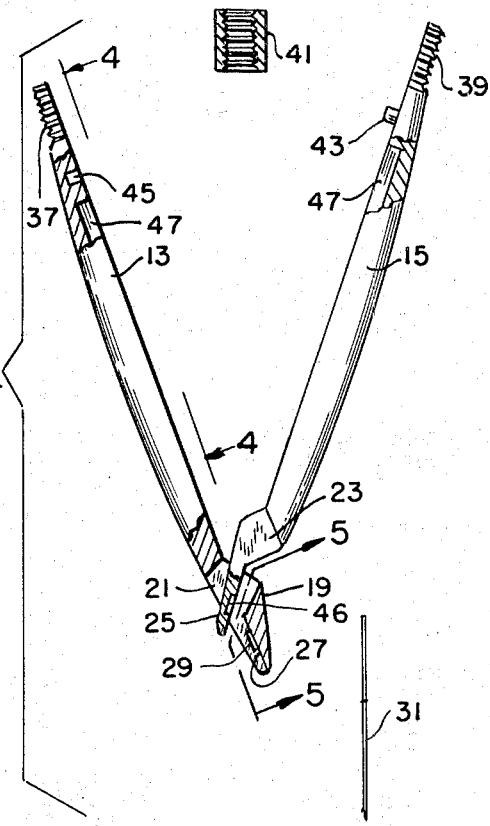
FIG. 4 FIG. 6 FIG. 5
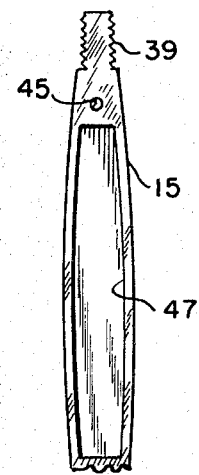
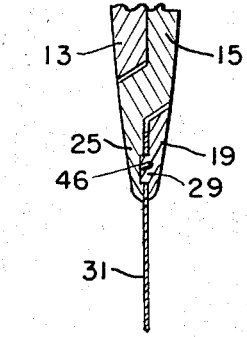
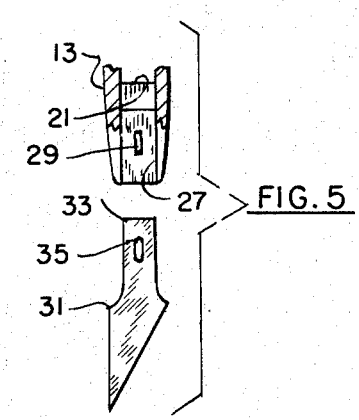

TOOL HOLDER

SUMMARY OF THE INVENTION

The present invention relates to an improved tool holder comprising a pair of handle members interconnected in centerless pivot fashion adjacent one end to releasably clamp a tool therebetween. The other end of the handle members are secured by fastener means which holds the one end of the handle members in clamped engagement with the tool. The tool holder is constructed for ready and secure tool retention and/or replacement, is adapted for use with a variety of tools, and is shaped for comfortable handling and easy use.

Main objects of the present invention, therefore, are to provide an improved tool holder constructed to facilitate easy and comfortable handling and manipulation and secure tool retention, which allows for quick and easy tool removal and/or replacement, and which is versatile in that it is adapted for use with a variety of tools and implements.

Further important objects of the present invention are to provide an improved tool holder of the above character which embodies the utmost in simplicity and ease in manufacturing, and is, therefore, relatively inexpensive to manufacture, and which is neat and aesthetically pleasing in appearance and reliable in use.

Other objects and advantages of this invention will become more apparent from the detailed description to follow taken in conjunction with the claims and the drawings annexed hereto.

BRIEF DESCRIPTION OF THE DRAWINGS

FIG. 1 is a side elevational view illustrating a tool holder embodying the present invention;

FIG. 2 is a top plan view, partly in section, of the tool holder shown in FIG. 1;

FIG. 3 is a plan view, partly in section, showing the tool holder of this invention in the open or released position, and the tool removed;

FIG. 4 is a view of a portion of FIG. 3 taken along the line 4—4 thereof;

FIG. 5 is a sectional view of FIG. 3 taken along the line 5—5 thereof; and

FIG. 6 is a sectional view of FIG. 1 taken along the line 6—6 thereof.

DETAILED DESCRIPTION

Referring now more particularly to the drawings, a knife blade holder, which is one type of tool holder in which the present invention finds particular use, is illustrated generally at 11 and is seen to include first and second elongated, confronting members 13, 15 which mate along a generally longitudinally extending parting line 17. Member 13 is formed with an enlarged head 19 at one end and has a shaped, generally rectangular aperture 21 extending angularly therethrough. Member 15 has an angular offset 23 adapted to slidably fit through aperture 21. In addition, member 15 has a nose 25 projecting forwardly from offset 23 and fitting within a recess 27 in the outer side of head 19 when offset 23 is fitted through aperture 21 and members 13, 15 are engaged along parting line 17. When so fitted together, as shown in FIG. 2, members 13, 15 form a smooth, continuous construction devoid of any protrusions or sharp edges.

As shown in FIGS. 3 and 5, a locating pin or projection 29 is formed on the head 19 of member 13 and is located in recess 27. A blade 31 adapted for use with the holder of the present invention has a tang 33 shaped generally complimentary to and fitting within recess 27 and is provided with a slot 35 receiving the projection 29. With the blade tang 33 so positioned, and with the nose 25 of member 15 overlaying pin 29 and clamped against tang 33, blade 31 is securely held in place.

The ends of the members 13, 15 remote from blade 31 are formed with relatively coarse semi-cylindrical threads 37, 39 which, when the members 13, 15 are fitted together as shown in FIGS. 1 and 2, are adapted to be threadedly received in a nut 41. A pin 43 formed on member 15 is received in a blind bore 45 in member 13 to help locate and position threads 37, 39 in alignment to engage the threads in nut 41. If desired, nut 41 may have its outer surface fluted for easy manual manipulation.

To assemble the blade and blade holder, members 13, 15 are first positioned as shown in FIG. 4 with nose 25 extending through aperture 21. A blade 31 is then fitted with its tang 33 in recess 27 and its slot 35 fitted over pin 29. Thereafter, member 15 is moved (pivoted) to fit offset 23 in aperture 21 which brings nose 25 adjacent pin 29 and pin 43 into bore 45, as shown in FIG. 6. Finally, nut 41 is threaded in place on threads 37, 39. Preferably, nose 25 is recessed at 46 adjacent pin 29 so as to press tightly against blade tang 33 when positioned as shown in FIG. 6.

It will be appreciated that the members 13, 15 are interlocked and the blade 31 securely retained in place without the need for accurately machined parts. Thus, members 13, 15 can be die cast aluminum, zinc, stainless steel, or cast iron, or they can be constructed of a moldable plastic, for example, with pins 29, 43, and threads 37, 39 formed integral therewith. As cast (or molded) the members 13, 15 can have smooth, generally flat sides (in cross-section) for easy handling, manipulation and control.

Retention of the blade 31 is achieved by nose 25 pressed thereagainst and by the pin 29 fitted into aperture 35, and, to this end, nose 25 and recess 27 are shaped so that nose 25 engages blade shank 33 before members 13, 15 come together, and is deflected slightly when members 13, 15 mate along parting line 17, thereby insuring secure blade retention. Threads 37, 39 are relatively coarse to easily be received in nut 41 which, can be a threaded extrusion constructed of suitable metal or plastic, and is also a relatively inexpensive part requiring no machining.

Furthermore, the interlocked relationship of the members 13, 15 is achieved through a minimum of parts, the "centerless pivot" afforded by the cooperating offset 23 and aperture 21, and the clamping engagement between nose 25 and recess 27, provides the desired interaction between the component parts without requiring separate pivot connections or accurately finished surfaces which are subject to failure, or are expensive to form and assemble, or both.

Also, the disposition of the centerless pivot adjacent the blade end of members 13, 15, with the nut fastener 41 at the other end provides a substantial mechanical advantage in securing the blade 31 in place. In addition, a decided advantage is afforded in that the fastener (nut 41) is at the end of the holder 11 remote from the blade 31, and is not positioned at a location where the user will normally place his hand. Thus, the members 13, 15 can be shaped and contoured for maximum ease and comfort in handling. Finally, one or both of the members 13, 15 can be hollow thereby forming an internal cavity 47 which can be used for storing additional blades.

By the foregoing, there has been disclosed a preferred form of tool holder calculated to fulfill the inventive objects set forth hereinabove, and while this preferred embodiment of the invention has been illustrated and described herein, various additions, substitutions, modifications and omissions may be made thereto without departing from the spirit of the invention. For example, it will be appreciated that other tools, such as saws, files, chisels, etc., as well as other implements, can be utilized with the tool holder of this invention.

I claim:

1. A tool holder comprising an elongated handle formed from a pair of elongated confronting members, one of said members having an aperture closely adjacent one end, the other of said members being slidably fittable through said aperture whereby to interlock said handle members in centerless pivot fashion, said aperture and said other member being sized to allow straight assembly and disassembly of said members without turning thereof, said elongated members being formed at said one end to clampingly engage a tool therebetween when pressed together in said confronting relationship, said elongated members being formed at their other ends with complementary screw threads, and a nut removably threaded on said other ends of said members to hold said members in said confronting relationship and clampingly engaged with said tool.

2. A tool holder comprising an elongated handle formed from a pair of elongated confronting members, one of said members having an aperture closely adjacent one end, the other of said members being slidably fittable through said aperture and being devoid of any positive connection therewith, whereby to interlock said handle members in centerless pivot fashion, said aperture and said other member being sized to allow straight assembly and disassembly of said members without turning thereof, said elongated members being formed at said one end to clampingly engage a tool therebetween when pressed together in said confronting relationship, said elongated members being formed at their other ends with integral complementary means, and fastening means removably secured to said integral complementary means on said other ends of said members to hold said members in said confronting relationship and clampingly engaged with said tool.

3. A tool holder comprising an elongated handle formed from a pair of elongated confronting members, one of said members having an aperture closely adjacent one end, the other of said members having an angular offset closely adjacent one end and being slidably fittable through said aperture whereby to interlock said handle members in centerless pivot fashion, said aperture and said other member being sized to allow straight assembly and disassembly of said members without turning thereof, said elongated members being formed at said one end to slightly deflect and claimpingly engage a tool therebetween when their other ends are pressed together in said confronting relationship, said elongated members being formed at their other ends with complementary screw threads, and a nut removably threaded on said other ends of said members to hold said members in said confronting relationship and clampingly engaged with said tool.

4. A tool holder comprising an elongated handle formed from a pair of hollow elongated confronting members which, when fitted together form a smooth, continuous body, one of said members having an aperture closely adjacent one end, the other of said members, being slidably fittable through said aperture whereby to interlock said handle members in centerless pivot fashion, said aperture and said other member being sized to allow straight assembly and disassembly of said members without turning thereof, said elongated members being formed at said one end to clampingly engage a tool therebetween when pressed together in said confronting relationship, said elongated members being formed at their other ends with complementary screw threads, and a nut removably threaded on said other ends of said members to hold said members in said confronting relationship and clampingly engaged with said tool.

5. A tool holder comprising an elongated handle formed from a pair of elongated confronting members, one of said members having an aperture closely adjacent one end, the other of said members being slidably fittable through said aperture whereby to interlock said handle members in centerless pivot fashion, said aperture and said other member being sized to allow straight assembly and disassembly of said members without turning thereof, said elongated members being formed at said one end to clampingly engage a tool therebetween when pressed together in said confronting relationship, said elongated members each being generally semi-cylindrical at their other ends and formed with integral means defining continuous screw threads, and a nut removably threaded on said other ends of said members to hold said members in said confronting relationship and clampingly engaged with said tool.

* * * * *